United States Patent
Boone et al.

(10) Patent No.: US 8,585,856 B1
(45) Date of Patent: *Nov. 19, 2013

(54) PROCESS FOR FABRICATING AIRCRAFT PARTS USING AN INTEGRATED FORM

(75) Inventors: Richard Boone, Wichita, KS (US); John W. Gallman, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 172 days.

This patent is subject to a terminal disclaimer.

(21) Appl. No.: 12/779,744

(22) Filed: May 13, 2010

(51) Int. Cl.
B32B 37/10 (2006.01)

(52) U.S. Cl.
USPC ........... 156/285; 156/286; 156/287; 156/156; 264/511; 264/512; 264/571

(58) Field of Classification Search
USPC .......... 156/156, 285–287, 381, 382; 264/520, 264/511, 512, 571
See application file for complete search history.

(56) References Cited

U.S. PATENT DOCUMENTS

| | | | |
|---|---|---|---|
| 4,770,929 A | 9/1988 | Nobumasa et al. | |
| 4,833,029 A * | 5/1989 | DuPont et al. | 428/116 |
| 5,123,985 A | 6/1992 | Evans et al. | |
| 5,242,523 A | 9/1993 | Willden et al. | |
| 5,368,807 A | 11/1994 | Lindsay | |
| 5,562,796 A | 10/1996 | Ertl | |
| 5,604,010 A | 2/1997 | Hartz et al. | |
| 5,707,576 A | 1/1998 | Asher | |
| 6,128,998 A | 10/2000 | Freitas et al. | |
| 6,458,309 B1 | 10/2002 | Allen et al. | |
| 6,589,472 B1 | 7/2003 | Benson et al. | |
| 6,632,502 B1 | 10/2003 | Allen et al. | |
| 7,993,479 B2 | 8/2011 | Sander et al. | |
| 2002/0006523 A1 | 1/2002 | Obeshaw | |
| 2002/0071920 A1 | 6/2002 | Obeshaw | |
| 2003/0082385 A1 | 5/2003 | Li et al. | |
| 2003/0168555 A1 | 9/2003 | Livi et al. | |
| 2003/0198775 A1 * | 10/2003 | Roth et al. | 428/68 |
| 2004/0115299 A1 | 6/2004 | Potter et al. | |
| 2004/0175555 A1 | 9/2004 | Ogisu | |
| 2005/0183818 A1 | 8/2005 | Zenkner et al. | |
| 2006/0006599 A1 | 1/2006 | Shahidi et al. | |
| 2006/0049552 A1 | 3/2006 | Fish | |
| 2006/0254710 A1 | 11/2006 | Jung et al. | |
| 2008/0083494 A1 | 4/2008 | Sander et al. | |
| 2008/0265093 A1 | 10/2008 | Lopez et al. | |

(Continued)

OTHER PUBLICATIONS

Office Action issued on Aug. 1, 2011 in related U.S. Appl. No. 12/779,706, 18 pages.

(Continued)

Primary Examiner — Christopher Schatz
(74) Attorney, Agent, or Firm — Lathrop & Gage LLP

(57) ABSTRACT

A fabrication process using an integrated form includes assembling at least two independent sections of composite laminate about a form, such that at least a portion of the sections overlap. A bonding agent is applied between the sections, at the overlap, and the form and laminate assembly are vacuum-bagged. The bag is sealed around a vent in the form, and about the laminate assembly. A vacuum is applied within the bag, to bond the sections, and the bagged assembly is autoclaved, to cure the bonded laminate sections. The vent allows equalization of autoclave pressures within and outside of the form, to prevent crushing or deformation of the form during cure. The form becomes an integral and permanent part of the final composite product.

22 Claims, 12 Drawing Sheets

(56) References Cited

U.S. PATENT DOCUMENTS

| | | |
|---|---|---|
| 2009/0020645 A1 | 1/2009 | Cacciaguerra |
| 2009/0074905 A1 | 3/2009 | Matsen et al. |
| 2009/0261199 A1 | 10/2009 | McCarville et al. |
| 2009/0263618 A1 | 10/2009 | McCarville et al. |
| 2009/0283638 A1 | 11/2009 | Rodriguez et al. |
| 2009/0320398 A1 | 12/2009 | Gouvea |
| 2010/0098910 A1 | 4/2010 | Naritomi et al. |
| 2010/0159189 A1 | 6/2010 | Takagi et al. |
| 2011/0045232 A1 | 2/2011 | Kismarton |
| 2011/0097554 A1 | 4/2011 | Kehrl et al. |

OTHER PUBLICATIONS

Office Action issued in Related U.S. Appl. No. 12/829,234 dated Jan. 3, 2011, 10 pages.
Response to Office Action issued in Related U.S. Appl. No. 12/829,234 dated Mar. 18, 2011, 10 pages.
Office Action issued in Related U.S. Appl. No. 12/829,234 dated Mar. 31, 2011, 13 pages.
Notice of Allowance issued in related U.S. Appl. No. 12/779,706, dated Jan. 26, 2012, 9 pages.
Notice of Allowance issued in related U.S. Appl. No. 12/829,234, dated Jan. 19, 2012, 15 pages.

* cited by examiner

PROCESS FOR FABRICATING AIRCRAFT PARTS USING AN INTEGRATED FORM

CROSS-REFERENCE TO RELATED APPLICATIONS

This application is related to commonly-owned and copending U.S. patent application Ser. Nos. 12/779,762, filed May 13, 2010 and entitled "Process for Bonding a Vented Hollow Component," and 12/779,706, filed May 13, 2010 and entitled "Process for Bonding Components to a Surface." The disclosures of both related applications are incorporated herein by reference.

FIELD

This invention relates to the fabrication of advanced composite aerostructure articles.

BACKGROUND

Demand for strong, lightweight aircraft has led to widespread fabrication of aircraft parts from composite materials. Composite structures typically include inner and outer composite skins, with a core (e.g., a honeycomb core material) or stiffening member therebetween. These structures are commonly bonded via multiple curings in an autoclave. For example, the inner and outer skins may be separately pre-cured in an autoclave, then assembled with adhesive, a honeycomb aluminum or non-metallic core and uncured closure plies into a sandwich panel. The sandwich panel is cured once to cure the closure plies, and then vacuum bagged to a composite bond jig and again cured in an autoclave.

Co-curing methods have been introduced in an attempt to reduce the steps, man hours and expense involved in the above process. In co-curing, composite skins laid-up with adhesive and a honeycomb core are cured in a single cycle in the autoclave. However, strength is lost in co-curing due to dimpling of the composite plies inward, with nothing but the cell walls to compact the composite skins. Additional plies may be added, but they add weight and cost to the finished part. Additional problems inherent to honeycomb core elements are described in U.S. Pat. No. 5,604,010 to Hartz et al., and U.S. Pat. Nos. 6,632,502 and 6,458,309, both issued to Allen et al.

The above-mentioned Allen patents discuss use of an internal air bag to counterbalance autoclave pressure during a single stage curing method. An internal air bag is placed inside a hollow, open-ended, stiffened graphite fabric mandrel that becomes an integral part of a finished aerostructure article. The lay-up (i.e., mandrel, bag, uncured composite layers and plies) is cured in an autoclave. Similarly, U.S. Patent Application Publication No. 2006/0006599 by Shahidi et al. describes a device that fits to a mould tool where an inflatable body with a pressurizable seal exits from the mould tool. When the body is inflated, the device prevents distortion and excess inflation of the pressurizable seal so that vacuum conditions can be applied there around.

As an alternative to inflatable mandrels, removable, rigid mandrels may be inserted within a prepreg lay up prior to autoclaving. The mandrels support the layup under autoclave pressures, and are removed from the final, cured product. For example, U.S. Pat. No. 6,589,472, issued to Benson et al., describes a combination tool/vacuum bag for compressing inner surfaces of composite parts. Composite parts, joints and webs are laid up around the tool/vacuum bag, and a separate, external vacuum bag is sealed to the assembly. Under vacuum pressure, the combination tool/vacuum bag expands outward to compress inner surfaces of the composite parts. After autoclaving, the assembly is reheated to soften and collapse the combination tool/vacuum bag, so that it can be removed.

Other techniques used in vacuum-bagging/bonding processes include placement of cushioning material between a layup and a vacuum bag, and using a vacuum bag, sealed to an edge of a component, in resin transfer molding. For example, U.S. Patent Application Publication No. 2005/0183818 by Zenker et al. suggests placement of an elastomeric caul beneath vacuum bagging material that is taped to a lay-up mandrel. The caul is stretched as negative pressure is applied, to draw the caul tightly against a composite component. Placing the caul between the component and the bagging material reduces wrinkling and deformation of the composite component by the bagging material. U.S. Patent Application Publication No. 2006/0049552 by Fish et al. describes vacuum assisted resin transfer molding for making a bond line between components. A vacuum bag is sealed against the edges of a component being bonded, and a vacuum is applied to draw injected resin through a flow path between the components.

SUMMARY

In an embodiment, a fabrication process using an integrated form includes assembling at least two independent sections of composite laminate about a form, such that at least a portion of the sections overlap. A bonding agent is applied between the sections, at the overlap, and the form and laminate assembly is vacuum-bagged. The vacuum bag is sealed around a vent in the form, and about the laminate assembly, and a vacuum applied within the bag, to bond the sections. The bagged form and laminate assembly are then autoclaved to cure the bonded laminate sections.

In an embodiment, a fabrication process using an integrated form includes placing a first laminate section on a tool surface, and placing a vented form on the first section. A bonding agent is selectively applied to the first section, and a second laminate section is placed at least partially about the form and in contact with the bonding agent, leaving the form vent clear. A vacuum bag is sealed around the form vent to enclose the sections while maintaining airflow through the form vent. A vacuum is applied within the vacuum bag, to bond the sections; and the bagged sections, form and tool surface are autoclaved to cure the bonding agent and form a composite laminate product. The vented form becomes a permanent part of the composite laminate product.

In one embodiment, a fabrication process using an integrated form includes assembling two or more laminate sections about a hollow form on a tool surface. A bonding agent is applied at a joinder of the sections, and the one more laminate sections are covered with vacuum bag material. The vacuum bag material is sealed to the tool surface, over the one or more sections, and to the paper form, over the one or more sections and proximate an open end of the form. A vacuum is applied within the sealed vacuum bag material, to compress and bond the sections; and the bagged sections, form and tool surface are autoclaved, to cure the bonding agent and form a composite laminate product. The hollow form forms a permanent part of the composite laminate product.

DETAILED DESCRIPTION OF THE EMBODIMENTS

Figure 1A:
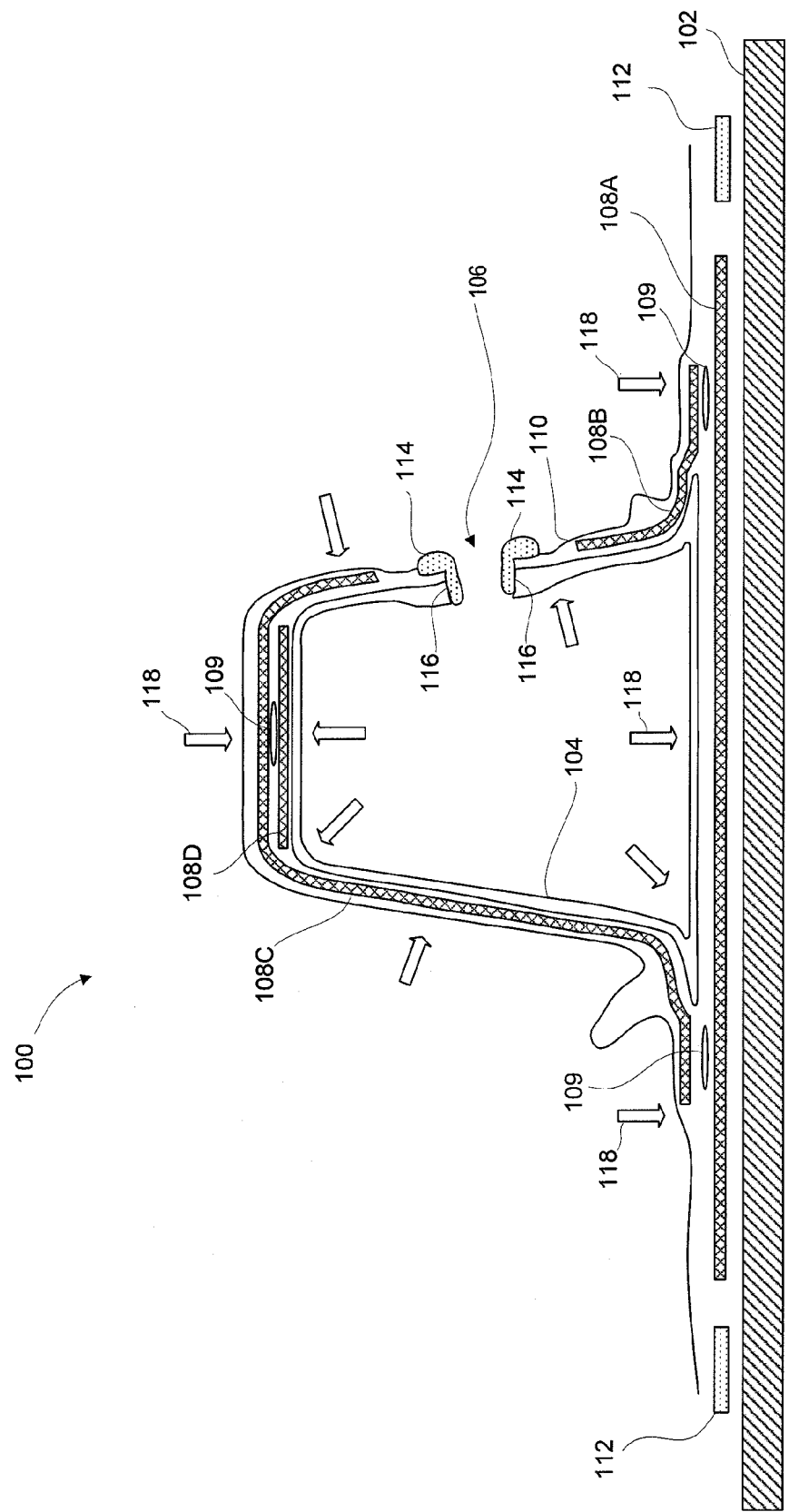
FIG. 1A is a schematic cross-sectional view of a prepreg layup including a vented form, according to an embodiment.

FIG. 1A is a schematic cross-sectional view through a prepreg layup 100, on a tool surface 102. Layup 100 includes an airtight vented form 104, taken through a vent 106. Form 104 is used to make structural shapes required for stiffened composite structures, for example, a hat for assembling a cross-stringer. Form 104 is vented to outside pressure via vent 106. As shown in FIG. 1A, vent 106 is formed in one portion of a hat. However, vent 106 may be formed elsewhere to allow for introduction of pressure-equalizing air within form 104. Where form 104 is open-ended (i.e., where form 104 supports a longitudinal stringer), the open ends of form 104 may serve as vent 106. See, for example, FIG. 2, described below. Vent 106, in this embodiment, is for example a round or otherwise shaped aperture in the side of layup 100, for introducing bag-inflating air inside layup 100 (i.e., within vented form 104). Layup 100 is thus subjected to the same pressure inside and outside, which prevents collapse of composite laminate 108 under pressure.

Composite laminate 108 is placed around form 104, on tool surface 102. Composite laminate 108 is shown in FIG. 1A as individual composite sections 108A-D. It will be appreciated that more or fewer sections may form composite laminate 108.

A bonding agent 109 may be selectively applied between individual composite laminate sections (e.g., between laminate sections 108A and 108B, between sections 108A and 108C and between sections 108C and 108D). It will be appreciated, in viewing FIG. 1A, that laminate "sections" 108B and 108C may be opposing sides of a single laminate section. A vacuum bag 110 is arranged over the form 104/laminate 108 layup and sealed to tool surface 102, around the laminate 108/form 104 layup, with adhesive 112. Adhesive 112 is for example sealing tape. A form-bag seal or seals 114 (not drawn to scale) seal vacuum bag 110 around the open edge/edges 116 of vent 106. The inside of form 104 thus remains open to outside environment, via vent 106. Vacuum bag 110 may be positioned about form 104 such that a pre-existing bag opening aligns with and is sealed to vent 106. Alternately, form 104 may be bagged and vacuum bag 110 sealed to tool surface 102, and vent 106 formed through bag 110 and form 104 after bag placement. Vacuum bag 110 is then sealed to vent 106 via form-bag seal 114, at the newly-formed opening.

In typical autoclave curing, parts are bagged and placed in the autoclave under a vacuum. The autoclave is then closed and allowed to pressurize. At a predetermined pressure (e.g., in excess of 15 psi), the vacuum connection is opened to outside air pressure (normal atmospheric pressure outside the autoclave). As long as the autoclave pressure is higher than the outside air pressure, gas expelled from the lamination during cure will exit. As long as the vacuum bag remains intact, autoclave pressure applies pressure to the laminate by pushing on the vacuum bag. An inflatable form or a removable, rigid form (e.g., mandrel) is used to prevent the composite from collapsing inward.

Vented form 104 eliminates the need for a rigid or inflatable mandrel. Vent 106 allows equalization of pressure within and outside of form 104, such that form 104 is subjected to net zero pressure, even while curing pressure is applied to laminate 108. In other words, autoclave pressure pushes outwards from inside form 104 while simultaneously applying pressure to laminate 108, as indicated by pressure arrows 118. Curing pressure is thus supplied without collapsing form 104. Form 104 thus provides structural support to laminate 108 (e.g., providing a shape for a stringer configuration). After curing, form 104 may be an integral and permanent part of the final laminate product.

In an embodiment, form 104 is made of a lightweight but relatively stiff material, for example a rigid paper insert, such as a paper mandrel. Form 104 provides structural support for a prepreg layup placed there around. Form 104 defines an air sealed chamber which, when vented, provides equal counter-balancing pressure necessary to prevent the layup and form 104 from being crushed by autoclave pressures. Form 104 is not removed from the final composite laminate product formed by the layup; but rather becomes an integral part of the product. Because form 104 is made of paper or another lightweight material, it contributes little weight to the final product. The potential for damage to the final product is also reduced, since the final product does not require tampering to remove form 104. Vented form 104 can be produced at low cost, and further reduces manufacturing costs (compared to conventional shaping and curing methods) by eliminating additional tooling and/or core materials (e.g., inflatable mandrels). Use of vented form 104 additionally facilitates single stage cures, reducing or eliminating secondary bonding and associated labor costs. Vented form 104 also facilitates formation of devices with small inside spaces (such as stringers) that are incompatible with mandrels.

Figure 1B:
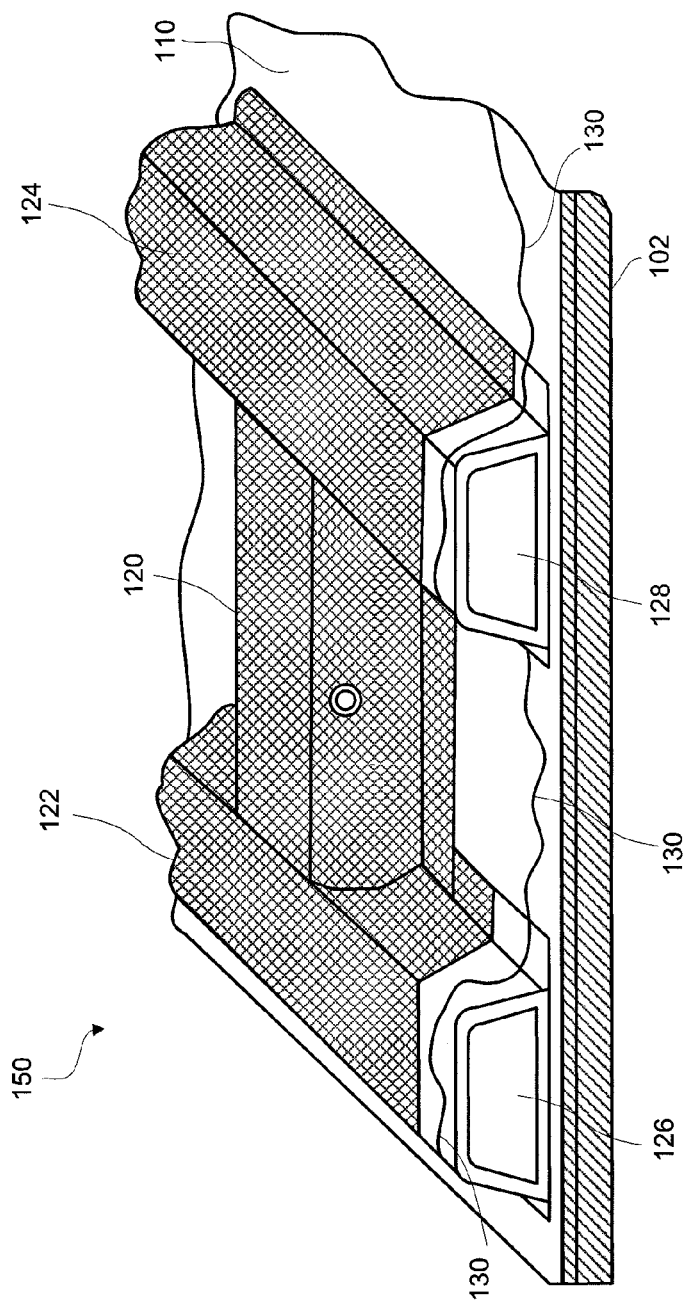
FIG. 1B is a perspective view of one environment in which the FIG. 1A vented form could be used in bagging and processing an isolated cross stringer.

FIG. 1B shows a typical environment in which the through-the-bag venting arrangement shown in FIG. 1A might be used. An assembly 150 includes a cross stringer 120 spanning between a first stringer 122 and a second stringer 124. As is common in manufacture, a network of longitudinal stringers (e.g., stringers 122 and 124) are run in parallel to one another, and reinforced cross-sectionally by cross members, e.g., stringer 120. While stringers 122 and 124 can be vented in a manner described below in discussions regarding FIG. 2, these later-described methods require access to open ends which can be extended outside a sealed perimeter 130 of bag 110 (e.g., ends 126 and 128 of stringers 122 and 124, respectively). It should be noted that the tape used to seal the bag perimeter 130 is not shown. The ends of cross stringer 120, are blocked on each side by the outer faces of outside stringers 122 and 124 and thus, cannot be accessed. This creates fabrication complications which are overcome by making a vent 106 through a portion of the bag and the composite intended to fabricate stringer 120 to allow the pressure in cross stringer 120 to be equalized.

Figure 2:
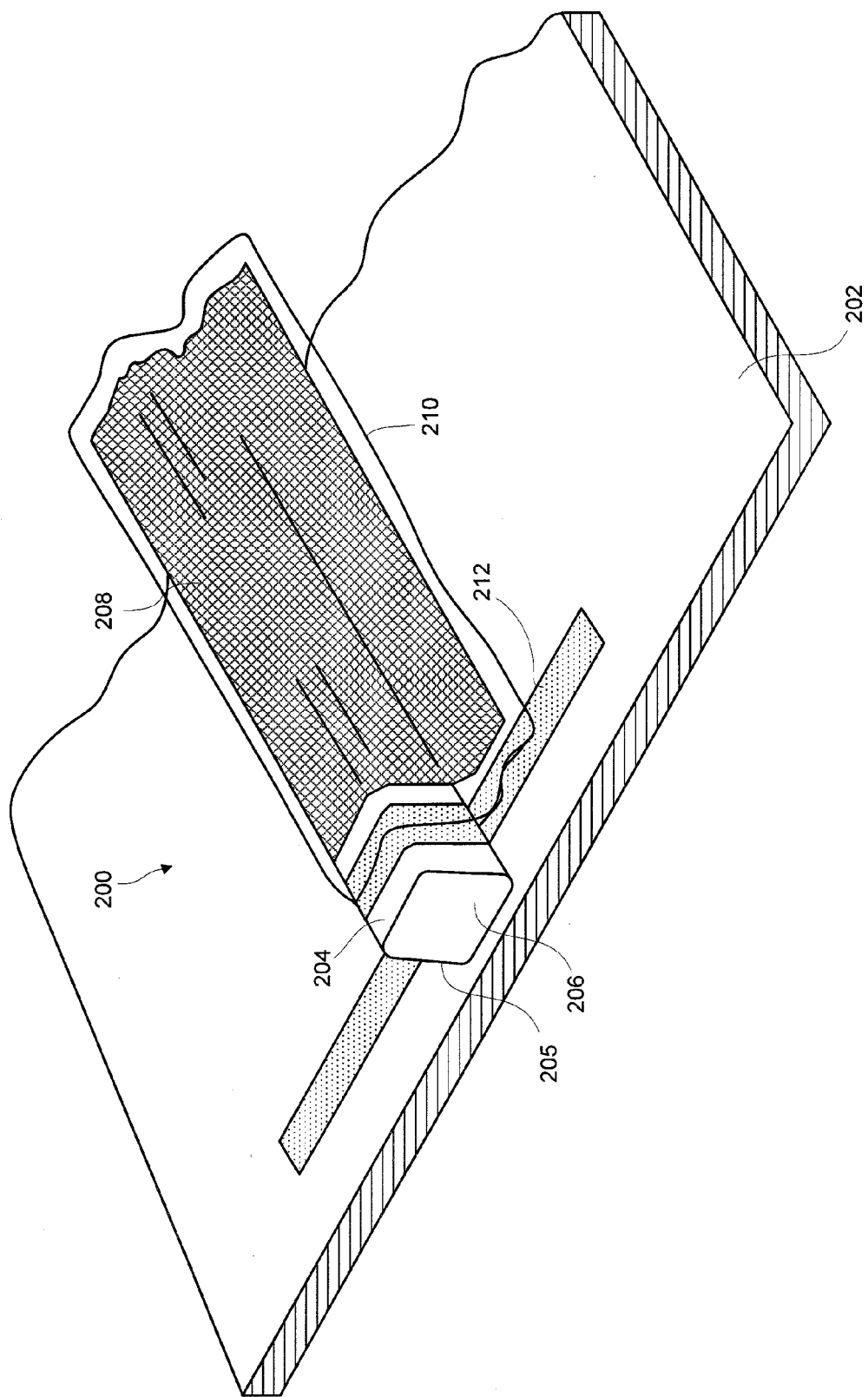
FIG. 2 is a perspective view of a prepreg layup including a vented form, according to an embodiment.

FIG. 2 is a perspective view of a prepreg layup 200 on a tool surface 202. A vented form 204 includes at least one open end 205 serving as a vent 206. Form 206 is for example a paper tube for supporting/forming a longitudinal stringer. Since ends of form 204 are open, no other vent may be needed. Composite laminate 208 is positioned about form 204, and a vacuum bag 210 is placed about laminate 208 and form 204 (e.g., form 204 and laminate 208 are at least partially inside of vacuum bag 210). Adhesive 212, which is for example a tape, seals vacuum bag 210 around form 204 and to tool surface 202. As shown in FIG. 2, adhesive 212 extends beneath form 204 along tool surface 202 and all around form 204, to seal vacuum bag 210 to tool surface 202 and around form 204, with laminate 208 completely enclosed by vacuum bag 210 and with open end 205/vent 206 protruding from vacuum bag 210. When autoclaved, vent 206 allows equal pressurization inside and outside of form 204, to prevent collapse of the form during autoclave curing of laminate 208.

Figure 3:
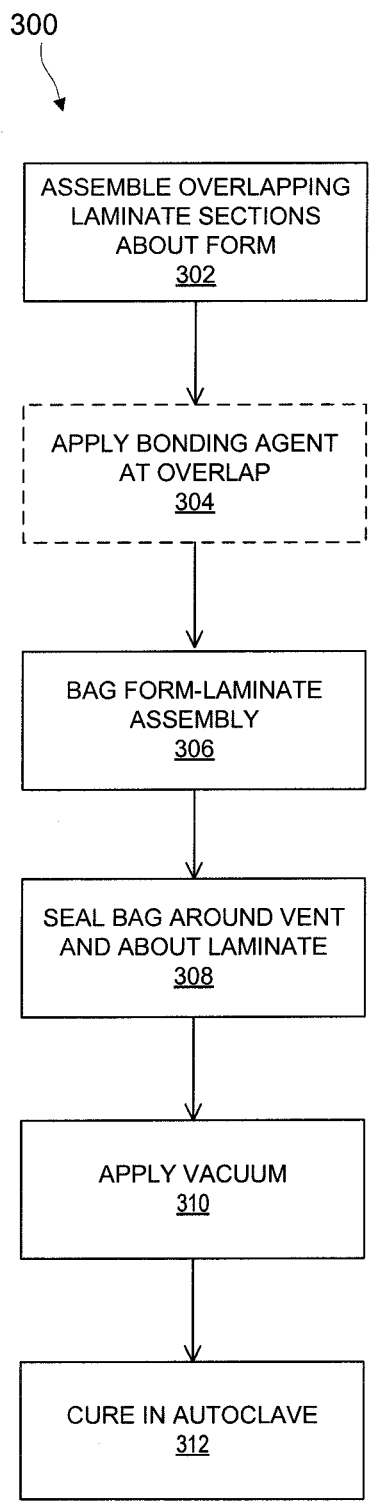
FIG. 3 is a flowchart depicting a fabrication process using an integrated form, according to an embodiment.

FIG. 3 is a flowchart outlining a basic fabrication process 300 using an integrated form. Overlapping laminate sections are assembled about a form, in step 302. In one example of step 302, laminate sections 108A-D are assembled about form 104 (see FIG. 1A). Form 104 is for example supported on tool surface 102. Bonding agent, such as bonding agent 109, is applied at an overlap/overlaps of the sections, in step 304, and the form-laminate assembly is bagged with vacuum bagging material (e.g., vacuum bag 110), in step 306. The bagging material is sealed around a vent in the form and about the laminate sections, in step 308. In one example of step 308, vacuum bag 110 is sealed to open edge/edges 116 of vent 106, such that laminate sections 108A-D are enclosed by vacuum bag 108. Vacuum bag 108 may likewise be sealed to tool surface 102 (step not shown in FIG. 3).

A vacuum is applied within the sealed bag, in step 310, and the assembly is cured in an autoclave, in step 312. For example, the assembly may be placed in an autoclave with a vacuum connection to bag 108, and a vacuum may be applied within bag 110 to compress laminate sections 108A-D together, allowing bonding agent 109 to bond the sections. Once a predetermined autoclave pressure is reached, the vacuum connection is opened and autoclave pressure is transferred to laminate sections 108A-D to maintain and/or augment compression while the bonding agent cures. Vent 106 allows pressure equalization within and outside of form 104, preventing collapse or deformation of the form as the laminate is compressed.

Figure 4:
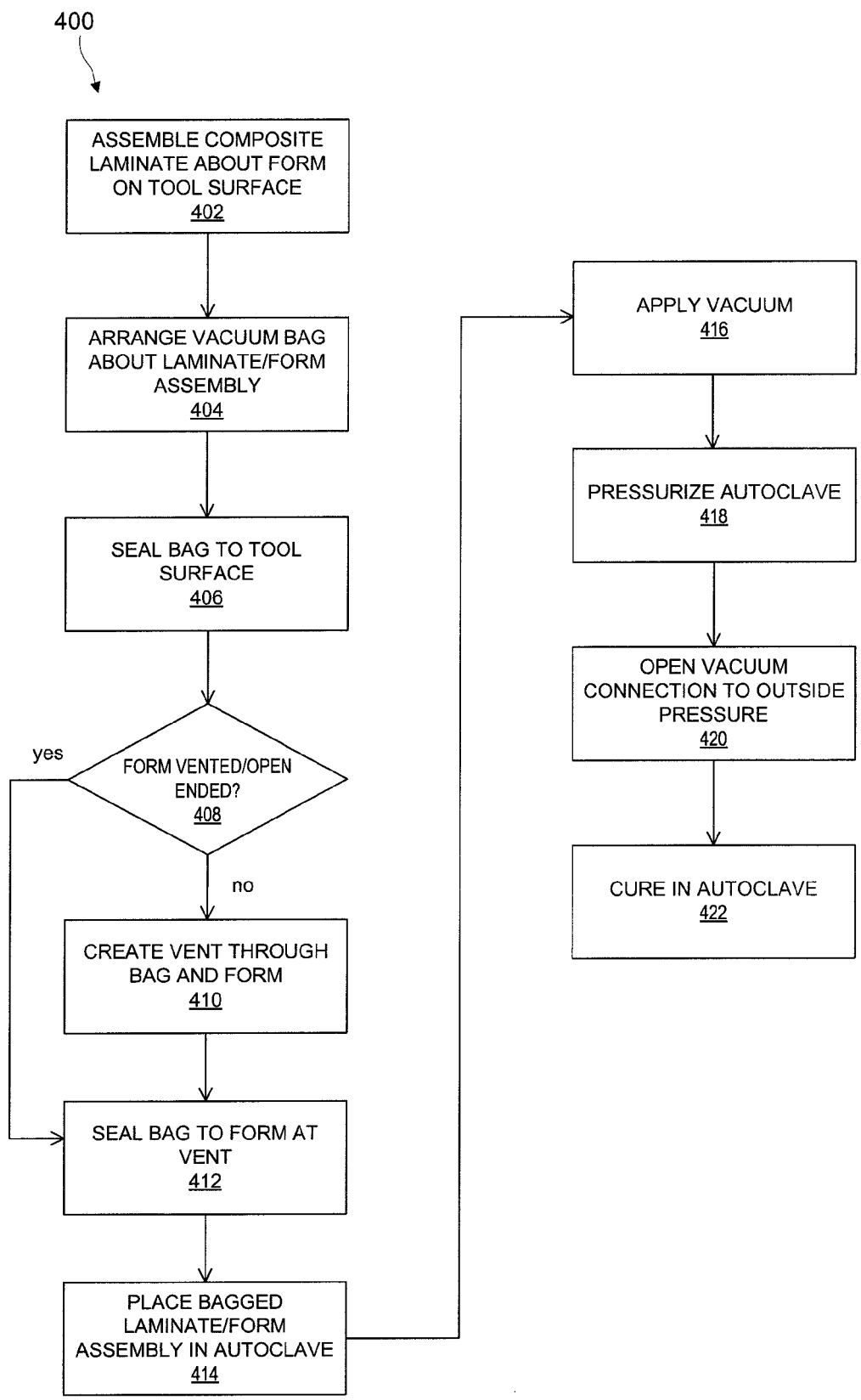
FIG. 4 is a flowchart showing additional steps in a fabrication process such as that of FIG. 3, according to an embodiment.

FIG. 4 is a flowchart depicting a fabrication process 400 using an integrated form. Process 400 includes additional detail not shown in FIG. 3, but not precluded from process 300.

Composite laminate is assembled about a form, on a tool surface, in step 402. A vacuum bag is arranged about the laminate/form assembly, in step 3404, and sealed to the tool surface, in step 406. If the form is vented or open-ended (decision 408), the vacuum bag is sealed to the form at the vent, in step 412. If the form is not vented, a vent is first created through the bag and the form, in step 410.

The bagged laminate/form assembly is placed in an autoclave, in step 414. A vacuum is applied to the bagged assembly, in step 416. The autoclave is pressurized in step 418, and, when a predetermined autoclave pressure is achieved, the vacuum connection to outside atmospheric pressure is opened, in step 420. The laminate cures in the autoclave, in step 422.

In one example of steps 402-412, laminate 108 is arranged about form 104, on tool surface 102. For instance, composite laminate section 108A is placed on tool surface 102, form 104 is placed on section 108A, bonding agent 109 is selectively applied to section 108A, and section 108C or section 108D is arranged with form 104, partially overlapping section 108A at bonding agent 109. Vent 106 is unobstructed by laminate 108. In another example, as shown in FIG. 1A, section 108A underlies form 104, section 108B is placed along a side of form 104, section 108D is arranged on top of form 104, and section 108C is arranged along the side of form 104 opposite section 108B, and on top of form 104 and section 108D. Bonding agent 109 is selectively placed between sections 108. Vacuum bag 110 is arranged around the laminate 108/form 104 assembly. Vacuum bag 110 is sealed to tool surface 102 with adhesive 112 (e.g., tape), such that laminate 108 is completely covered. If form 104 has a pre-existing vent 106, vacuum bag 110 is sealed about vent 106 (i.e., to continuous edge 116 of aperture vent 106) with form-bag seal 114. If form 104 is not yet vented, vent 104 (e.g., an aperture) is created through vacuum bag 110 and form 104, and vacuum bag 110 is sealed about edge 116 of vent 104 via form-bag seal 114. The bagged laminate 108/form 104 assembly is placed in an autoclave, and a vacuum applied to the assembly. The autoclave is allowed to pressurize, for example to a predetermined pressure somewhere in excess of 15 psi, and the vacuum connection is opened to outside air pressure. Since autoclave pressure is higher than outside air pressure, vacuum bag 110 transfers autoclave pressure to laminate 108 (e.g., pushing on laminate 108). Vent 106 allows equalization of pressure within and outside of form 104, preventing collapse of form 104. In other words, as vacuum bag 110 pushes in and down on laminate 108, autoclave pressure within form 104 pushes up and out on form 104. (see pressure arrows 118, FIG. 1A). Form 104/laminate 108 assembly cures in the autoclave for a predetermined amount of time. Gas expelled from the laminate during cure exits via the vacuum connection. Form 104 remains an integral part of the finished product.

In another example of steps 402-412, the form is vented form 204 having open end 205. Laminate 208 is arranged about form 204 (for example, over and on at least one side of form 204) on tool surface 202. Where laminate 208 includes multiple laminate sections, a bonding agent (such as agent 019, FIG. 1A) may be used to secure the sections together. Vacuum bag 210 is arranged over laminate 208 and sealed to tool surface 202 and to form 204, proximate open end 205/vent 206 with adhesive 212. Adhesive 212 is shown at a slight distance from open end 205/vent 206, in FIG. 2; however, it will be appreciated that vacuum bag 210 may also be sealed to the edge of vent 206. In one aspect, vacuum bag 210 may be pulled up and over form 204/laminate 208 and sealed to tool surface 202 via a strip of adhesive 212 running along tool surface 202, beneath form 204. Vacuum bag 210 is then sealed around form 204 via additional adhesive 212. The assembly is then placed in an autoclave, and a vacuum applied within bag 210. Once the autoclave pressurizes to a predetermined pressure, the vacuum connection to the outside atmosphere (i.e., normal atmospheric pressure outside the autoclave) is opened, and laminate 208 is allowed to cure. Form 204 remains an integral part of the finished product.

Figure 5:
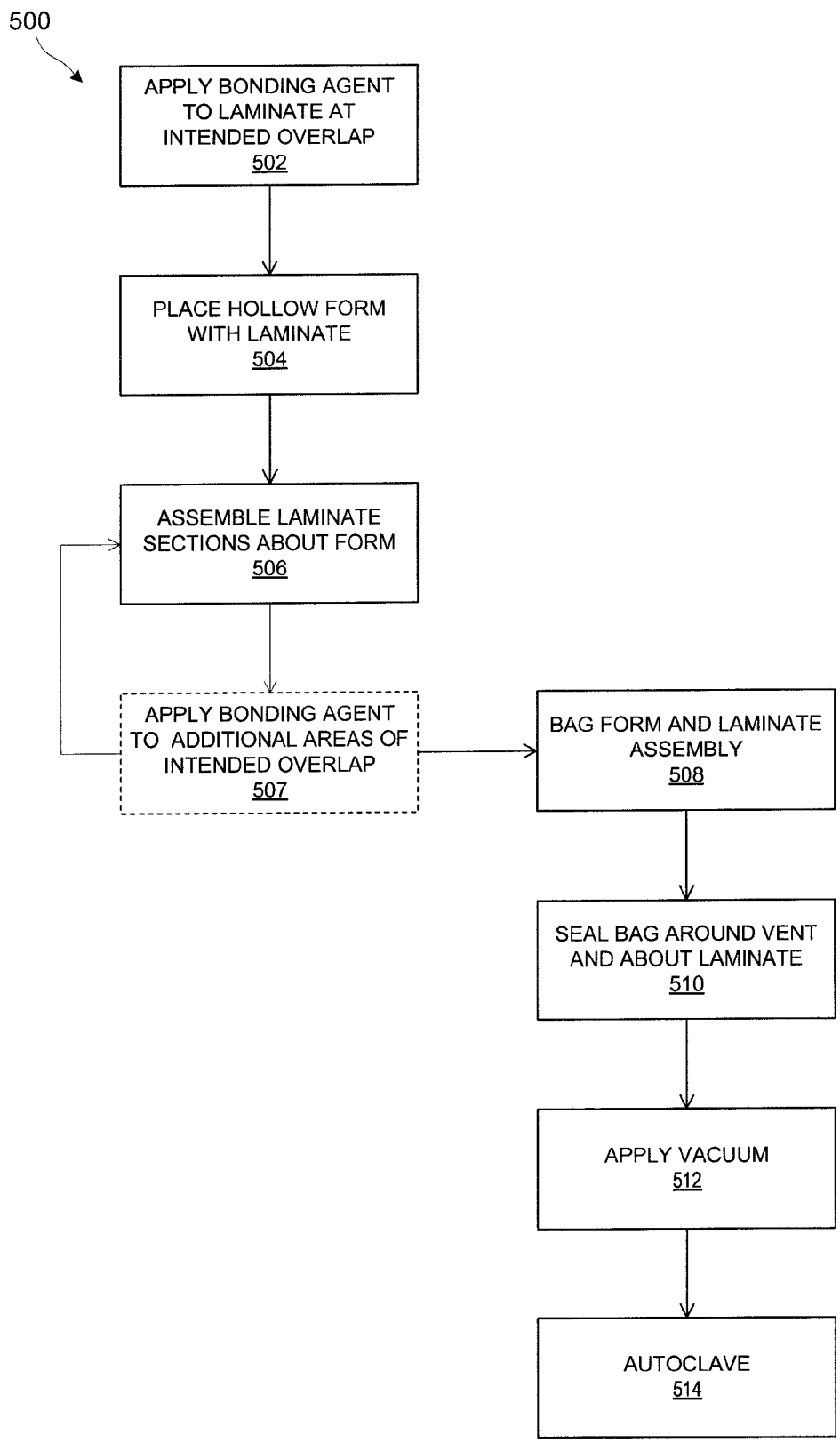
FIG. 5 is a flowchart showing a fabrication process using a vented integrated form, according to an embodiment.

FIG. 5 shows a flowchart illustrating a process 500 for fabricating aircraft parts using a vented form. A bonding agent is applied to at least one base composite laminate section, at an area of intended overlap with another composite laminate section, in step 502. A hollow form is placed with (e.g., atop) the base laminate section, in step 504. It will be appreciated that steps 502 and 504 are interchangeable. That is, the hollow form may be placed with the base laminate section prior to application of bonding agent to the base section. Laminate sections are assembled about the hollow form, in step 506, and additional bonding agent is applied to any additional areas of intended overlap (for example, if additional laminate is to be layered), in optional step 507. Steps 506 and 507 may repeat as necessary to place bonding agent at all intended areas of laminate overlap. Once all laminate is placed, the form and laminate assembly are bagged, in step 508.

In one example of steps 502-508, form 104 is placed with composite laminate section 108A, and bonding agent 109 is applied to composite laminate section 108A, at an intended area of contact/overlap between section 108A and section 108B, and at an intended area of contact/overlap between section 108A and section 108C. As noted above, it will be appreciated that sections 108B and 108C may represent opposing sides of one continuous laminate section interrupted by vent 106.

Once bonding agent 109 is appropriately applied to laminate section 108A, steps 506 and 507 repeat such that additional laminate section 108D is placed atop form 104, and bonding agent is applied to an upper surface of section 108D at an intended area of overlap with section 108C/108B. Section(s) 108B/108C are placed over sections 108A and 108D, in contact with bonding agent 109. Vacuum bag 110 is then placed about form 104 and laminate sections 108.

The vacuum bag is sealed around a vent in the form, and about the laminate, in step 510. This may include sealing the bag about a preexisting vent, or forming a vent through the vacuum bag and sealing the bag with the newly formed vent. Sealing the bag about the laminate for example includes sealing the bag to a tool surface, around the laminate. A vacuum is applied, in step 512. The bagged assembly is autoclaved for a sufficient time to cure the bonding agent and bond the laminate sections together about the form, in step 514.

In one example of steps 510-514, vacuum bag 110 is sealed about vent 106 using form bag seal 114. In one aspect, a vent 106 is created through bag 110 and laminate 108, and bag 110 is sealed about open edge 116. In another aspect, vacuum bag 110 is sealed about open edge 116 of a preexisting vent in laminate 108. Vacuum bag 110 is also sealed to tool surface 102, to enclose laminate 108.

Once sealed, a vacuum is applied within bag 110, and the laminate/form assembly is autoclaved as described above.

Figure 6:
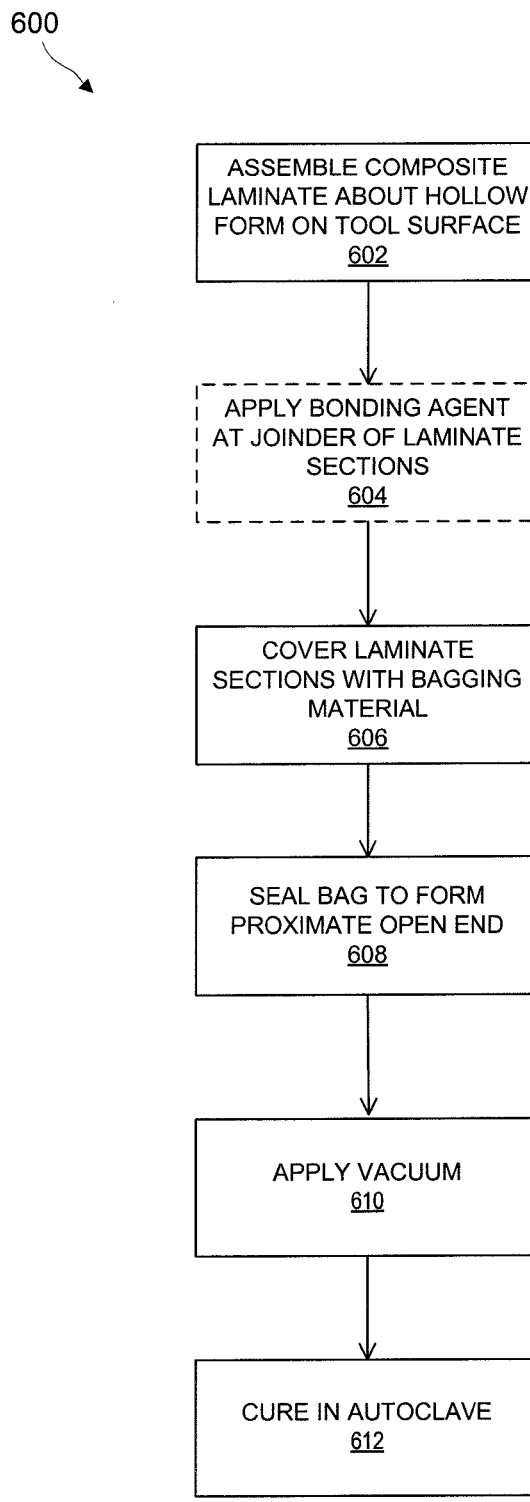
FIG. 6 is a flowchart illustrating a fabrication process an open-ended, integrated form, according to an embodiment.

FIG. 6 depicts a process 600 for fabricating aircraft parts using an open-ended integrated form. In step 602, composite laminate is assembled about a hollow form, on a tool surface. Bonding agent is applied at a joinder of laminate sections, in step 604. The laminate sections are covered with bagging material, in step 606, and the bagging material sealed to the form, proximate an open end of the form, in step 608. A vacuum is applied within the bagging material, in step 610, and the assembly is cured in an autoclave, in step 612.

In one example of steps 602-612, laminate 208 is assembled about form 204, on tool surface 202. Laminate 208 may include one or more laminate sections (see above discussion of FIG. 2). Bonding agent, e.g., bonding agent 109, is applied at any joinder of laminate sections, and laminate 208 is covered with vacuum bag 210. Vacuum bag 210 is sealed to form 204 proximate open end 205/vent 206, with adhesive 212, which is for example a tape. Any free edges of vacuum bag 210 may also be sealed to tool surface 202, to form a complete enclosure for laminate 208 (this enclosure may include the floor of tool surface 202). Open end 208 is left unobstructed, so that air pressure within and outside of form 204 may equalize.

A vacuum is applied within bag 210, to compress laminate 208 together and against the bonding agent (i.e., agent 109, shown in FIG. 1A). The form, laminate and tool surface are then cured in an autoclave. Because pressure equalizes within and outside of form 204, autoclave pressures do not deform or crush the form inward. See, for example, pressure arrows 118, FIG. 1A.

Figure 7:
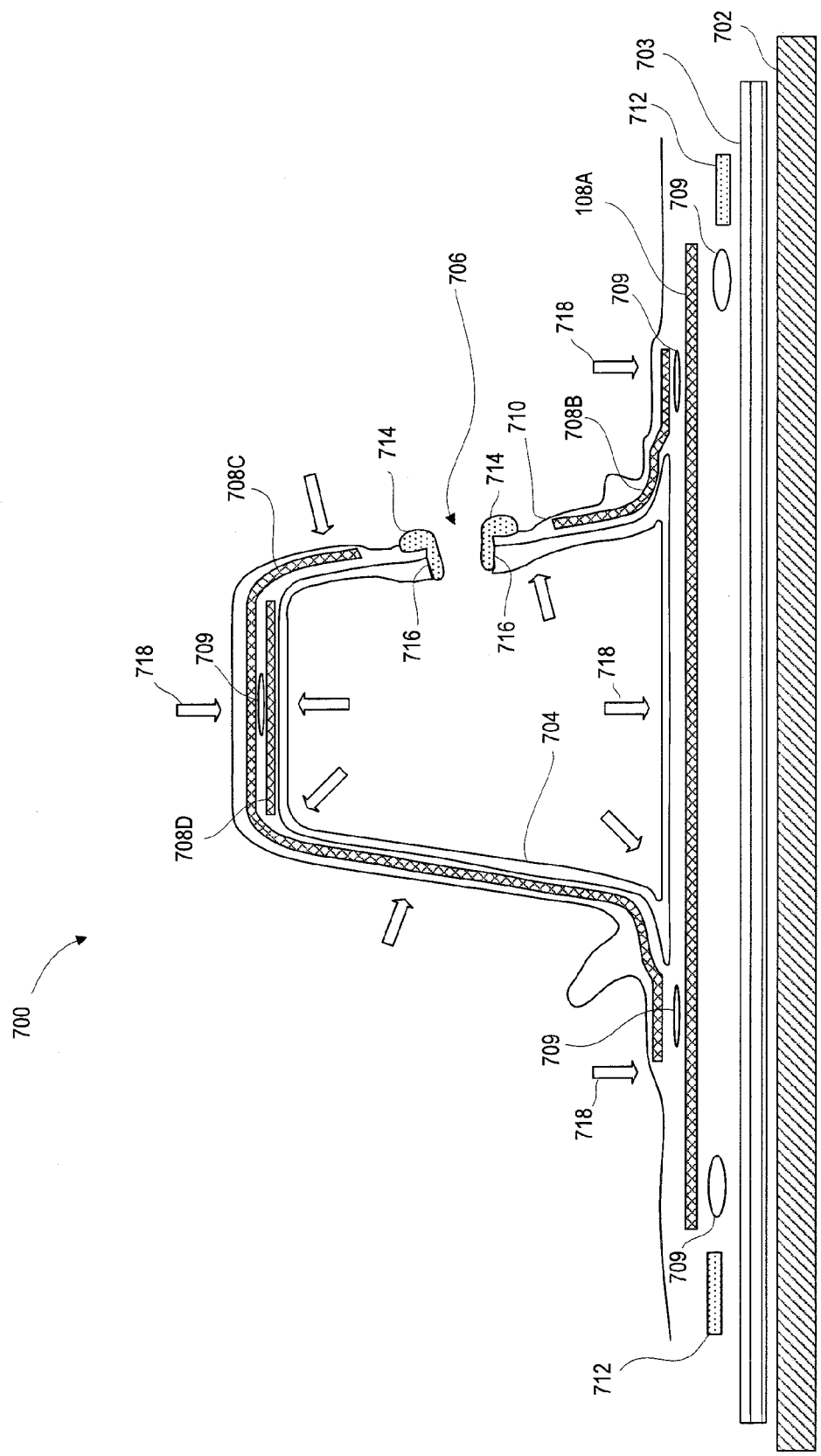
FIG. 7 is a schematic cross-sectional view of a prepreg layup, including a vented form, placed for bonding together and with an aircraft skin, according to an embodiment.

In an embodiment, a composite laminate structure, e.g., an aircraft part, may be formed and bonded together while simultaneously bonding to an aircraft skin. FIG. 7 shows a prepreg layup 700 with a tool surface 702 supporting an aircraft skin 703 with overlying multi-piece composite laminate 708. Laminate sections 708A-D are arranged about an inner form 704 and upon skin 703 on tool surface 702. In particular, a bonding agent 709 is applied to skin 703, to bond laminate section 708A to skin 703. Form 704 is arranged upon laminate section 708A, and additional bonding agent 709 is applied to one or more areas of laminate section 708A not covered by form 704. Laminate section 708D is placed atop form 704, bonding agent 709 is applied to laminate section 708D, and laminate section 708C is arranged over form 704, laminate section 708C and bonding agent 709, as illustrated.

A vacuum bag 710 is arranged over the form 704/laminate 708 layup (e.g., laminate sections 708A-D and form 704) and sealed to skin 703 around the laminate 708/form 704 layup, with adhesive 712. One or more form-bag seals 714 seal vacuum bag 710 about an open edge 716 (i.e., about the perimeter) of a vent 706, as described above with respect to exemplary FIGS. 1A, 5 and 6, such that laminate 708 is completely enclosed in vacuum bag 710. Laminate 708 is completely covered by vacuum bag 710; however, skin 703 need not be completely covered by vacuum bag 710.

When autoclaved, vent 706 allows pressure equalization inside and outside of form 704, preventing collapse of the form while composite laminate sections 708A-D are bonded/cured together and to skin 703. As described with respect to FIG. 1A, form 704 may be a permanent piece of the finished laminate product.

Figure 8:
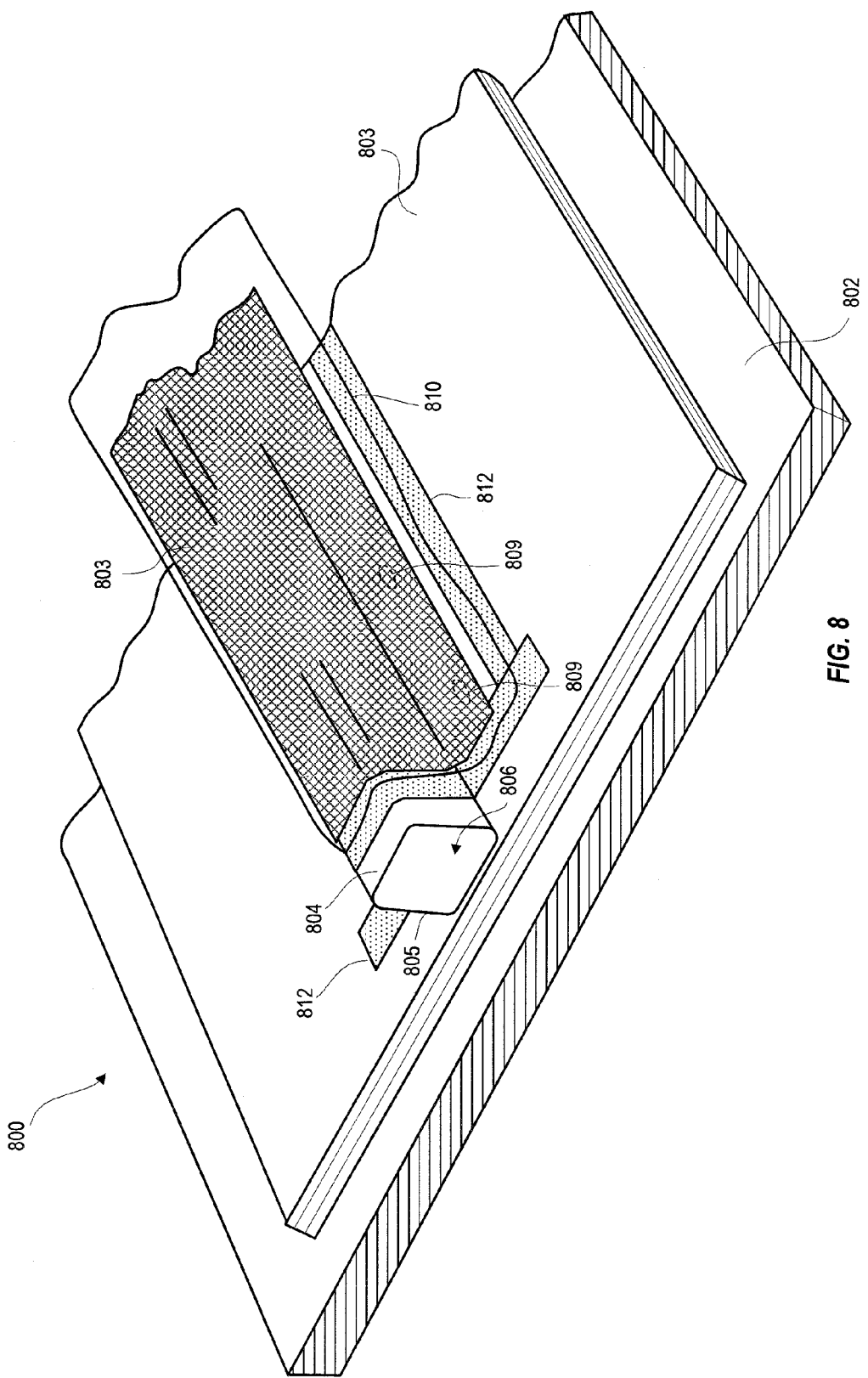
FIG. 8 is a perspective view of a prepreg layup including an open-ended form, placed for bonding together and with an aircraft skin, according to an embodiment.

FIG. 8 is a partial perspective view of a prepreg layup 800, including a skin 803, on a tool surface 802. A vented form 804 includes at least one open end 805, serving as a vent 806. Form 804 is for example a paper tube for supporting/forming a longitudinal stringer. Since at least one end 805 of form 804 is open, no other vent may be needed. One or more sections of composite laminate 808 are positioned about form 804, in contact with one or more areas of a bonding agent 809 (indicated by a dashed oval) on skin 803. Although not shown, it will be appreciated that since form 804 may form an integrated part of a final composite product, form 804 may also be secured to skin 803 via bonding agent 809, if laminate 808 does not continuously divide skin 803 and form 804. A vacuum bag 810 is placed about laminate 808 and form 804. For example, laminate 808 is enclosed in vacuum bag 810 and bag 810 sealed to form 804 proximate open end 805, leaving vent 806 open. Adhesive 812, which is for example a tape, seals vacuum bag 810 around form 804 and to skin 803. As shown in FIG. 8, adhesive 812 extends beneath form 804 along skin 803, and along form 804, to hold form 804 and bag 810 to the preformed component, around laminate 808. However, adhesive 812 need not hold form 804 to skin 803 when underlying and/or peripheral laminate 808 is bonded directly with skin 803. Under vacuum and autoclave pressure, bag 810 presses form 804 and laminate 808 together and to skin 803. Vent 806 allows equal pressurization inside and outside of form 804, to prevent collapse of the form during autoclave curing of laminate 808.

Figure 9:
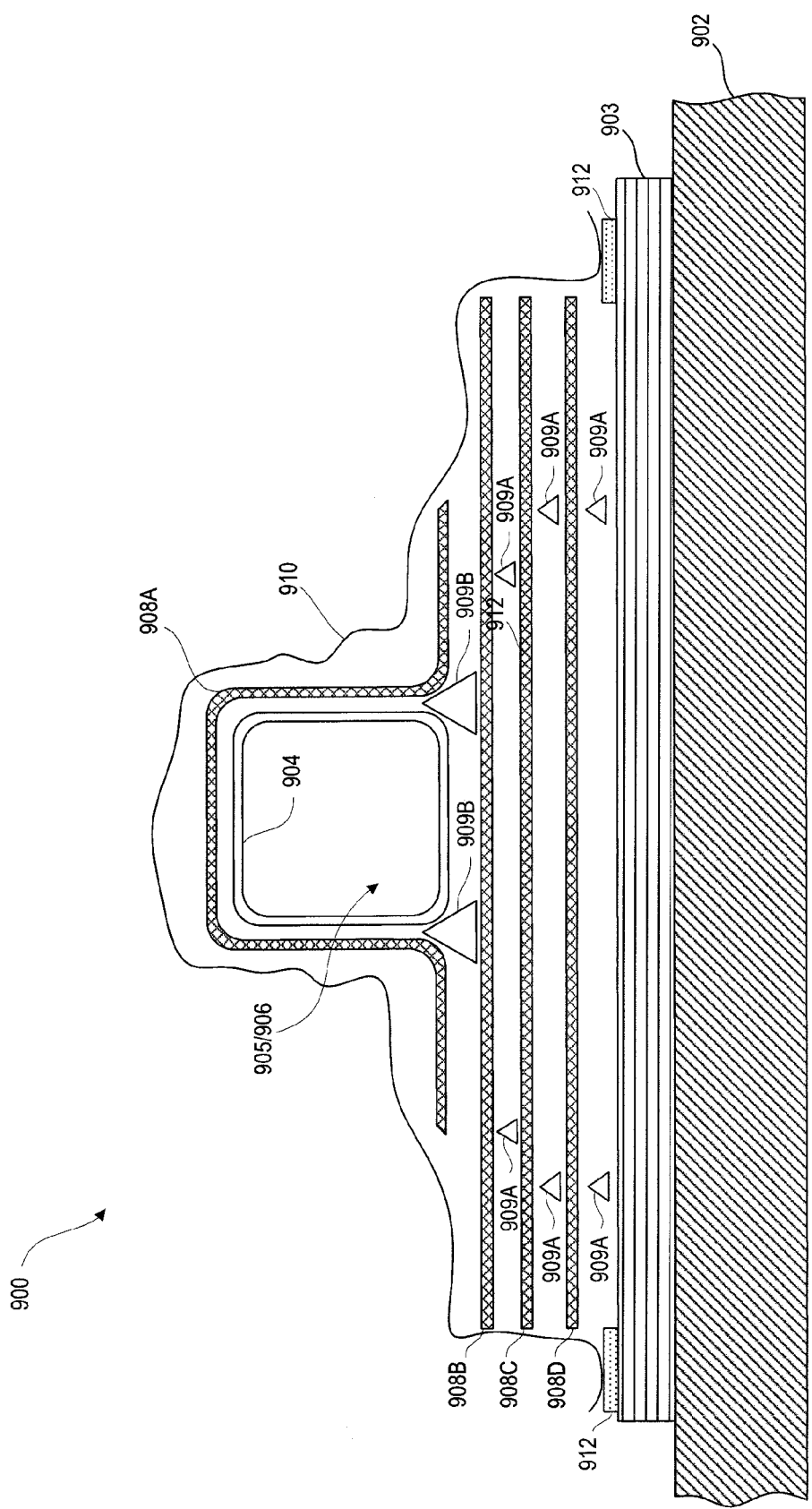
FIG. 9 is a cross-sectional view of a prepreg layup with an open-ended form, placed for bonding together and with an aircraft skin, according to an embodiment.

FIG. 9 is a partial side view of a prepreg layup 900 including multi-part laminate 908. A skin 903 is placed on a tool surface 902. Three sections of composite laminate 908B-D are arranged on skin 903, with bonding agent 909A between sections 908B and 908C, between sections 908C and 908D, and between section 908D and skin 903. A vented/open-ended form 904, with open end 905 forming a vent 906, is arranged on composite laminate section 908B, with additional bonding agent 909B placed proximate form 904. Additional composite laminate section 908A is arranged about form 904 and in contact with additional bonding agent 909B. Additional bonding agent 909B may therefore bond section 908A with section 908B, or bonding agent 909B may bond all of section 908A, section 908B and form 904. In the latter case, bonding agent 909B may be the same composition as bonding agent 909A, but applied in a larger amount or different thickness or shape, in order to contact all of section 908A, section 908B and form 904.

In one aspect, form 904 is a hollow tube of paper, lightweight plastic or another lightweight material. Laminate sections 908A-D are arranged around form 904 to form a hat to be bonded (e.g., glued) together and to skin 903, via bonding agent 909A and 909B. A vacuum bag 910 completely covers composite laminate sections 908A-D and is secured to skin 903 with an adhesive 912 (e.g., a single or double-sided tape). Since skin 903 is pre-cured and requires no additional pressurization via bag 910, bag 910 need not completely cover skin 903. Bag 910 is secured to form 904 without covering vent 906, e.g., as shown with bag 810, form 804 and vent 806 in perspective view FIG. 8. Vent 906 allows pressurization inside and outside of form 904 during autoclaving, thereby preventing inward collapse of form 904 under autoclave pressure. As further described with respect to laminate 1008 of FIG. 10, composite laminate sections 908A-D may be woven carbon fabric layers arranged such that the ply of each fabric layer is at a selected angle with respect to the ply of adjacent layers.

Figure 10:
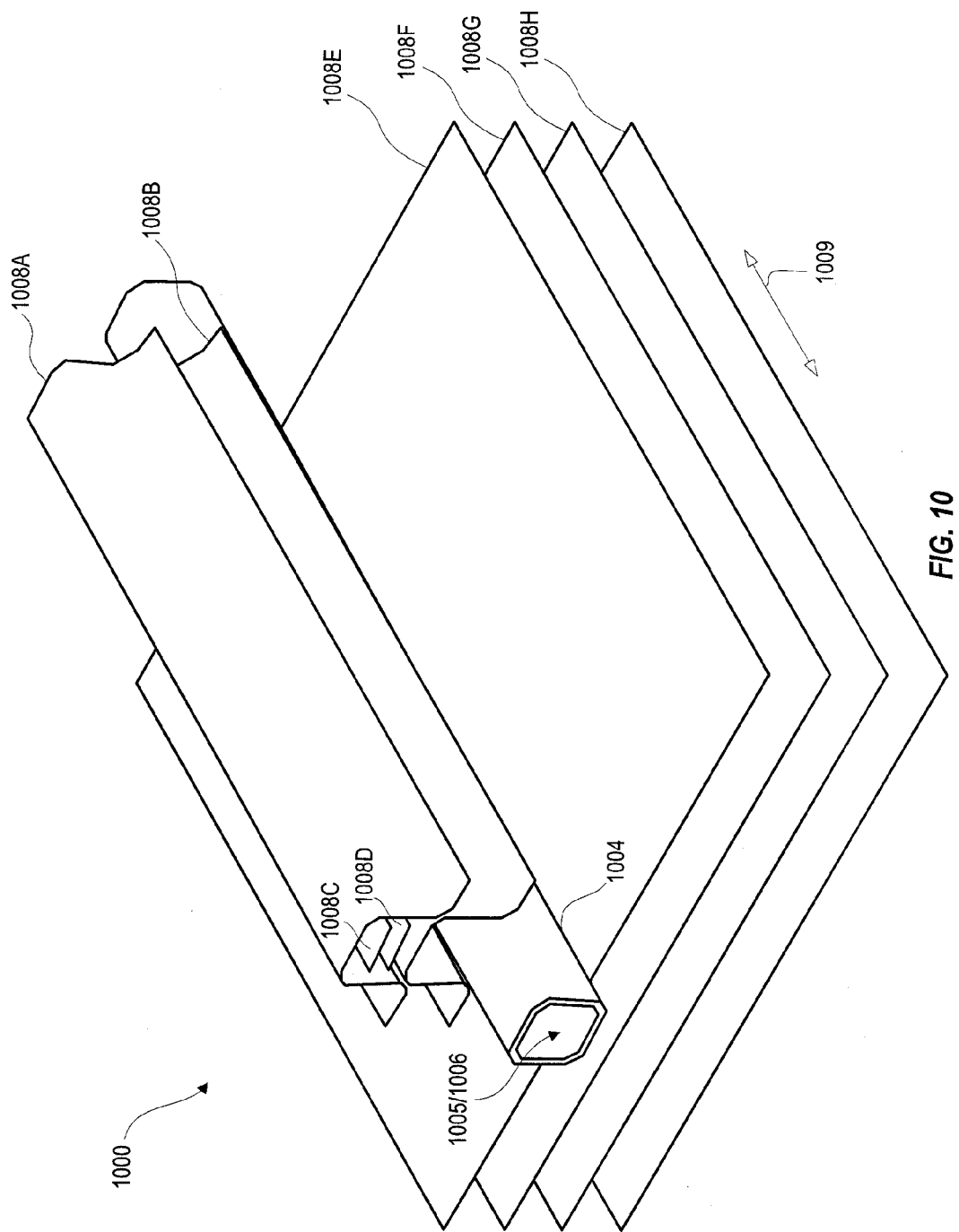
FIG. 10 is a perspective view of a composite laminate assembly for use in forming the prepreg layup of any of FIGS. 1A-2 and 7-9, with appropriate modifications.

FIG. 10 is a perspective view of a partial prepreg layup 1000 showing exemplary detail of a multi-part composite laminate 1008. It will be appreciated that, although not shown, prepreg layup 1000 may be bonded together using a vacuum bag, adhesives and bonding agents as described above, and may be formed directly on a tool surface, as described with respect to FIGS. 1A-3, or bonded together with a skin as described and shown with respect to FIGS. 7-9. The type, number and arrangement of laminate sections described below may be incorporated into any of prepreg assemblies 100, 150, 200, 700 and 800. For example, laminate sections 1008A-1008H, described below, may also be positioned with a vented form such as form 104 or form 704 (FIGS. 1A and 7, respectively) for bonding together and optionally also with a tool surface such as surface 702

Eight composite laminate sections 1008A-1008H are shown arranged about a tubular (hollow) form 1004. According to one embodiment, laminate sections 1008A-1008H are a woven carbon fabric. Sections 1008A, 1008D, 1008E and 1008H are arranged with their ply at 0° with respect to directional arrow 1009 (i.e., the ply of the woven carbon fabric aligns with arrow 1009). Sections 1008B, 1008C and 1008G are arranged such that their ply is at (negative) 45° (−45° with respect to arrow 1009. Section 1008F is arranged with its ply at positive 45°) (45° with respect to arrow 1009. Sections 1008E-1008H form a four-ply base for the finished composite laminate product, with sections 1008F and 1008G having fibers arranged at 45° and −45° with respect to the zero-degree arrangement of fibers of sections 1008E and 1008H. Selectively arranging sections 1008E-1008H with varying directional ply enhances end laminate strength and load balancing ability.

Sections 1008A-D form a four-ply composite segment that is joined with sections 1008E-1008H (e.g., as described above with respect to FIGS. 1A-3) and that includes two 45° layers (sections 1008B and 1008C, each arranged with ply at 45° with respect to arrow 1009) sandwiched between zero-degree sections 1008A and 1008D (whose ply aligns with arrow 1009 and the ply of sections 1008E and 1008H). Bonding agent such as agent 109/209/309/709/809/909, may be selectively applied between adjoining sections 1008A-1008H. Additional bonding agent or an adhesive, such as previously-described adhesive 112, 812 or others, secures sections 1008D and 1008E to a hollow form 1004 having an open end 1005 serving as a vent 1006 for facilitating pressurization within form 1004 under autoclave conditions, as described above.

Layup 1000 may be arranged over and bond with a skin, e.g., skin 703, 803, 903, as described above. Where layup 1000 is to be bonded with a skin, a vacuum bag (not shown, see above descriptions of bag 110, 810 and others) is arranged to enclose sections 1008A-H. The bag is for example taped or otherwise secured to form 1004 proximate, but not covering, vent 1006/open end 1005. The bag is likewise taped or otherwise secured to the skin, outside of sections 1008A-1008H and covering any bonding agent used to secure the skin to any of sections 1008A-1008H. Because it is pre-formed, the vacuum bag need not completely cover the skin.

Figure 11:
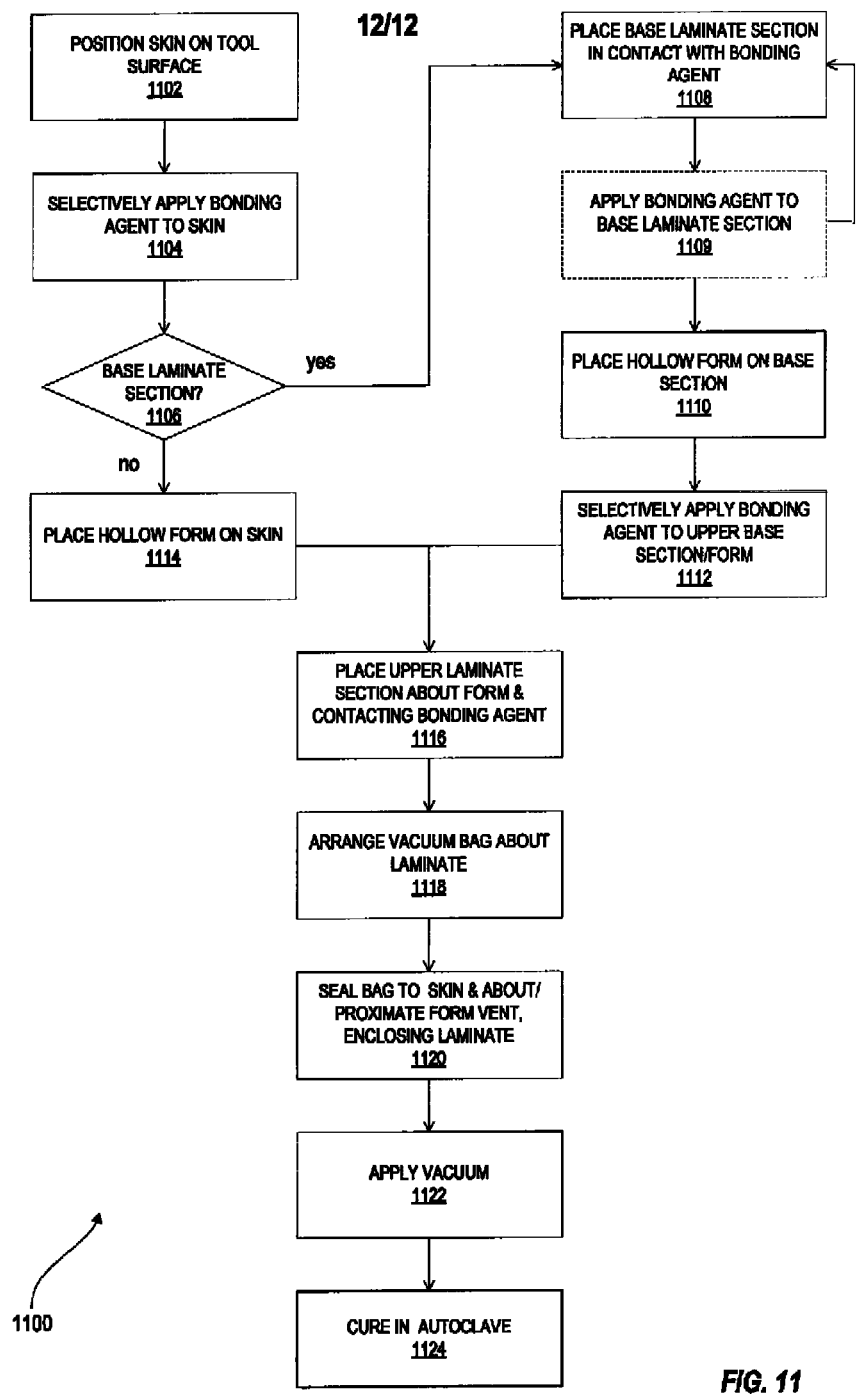
FIG. 11 is a flowchart depicting a process for fabricating an aircraft component while bonding with an aircraft skin, using a vented, integrated form, according to an embodiment.

FIG. 11 is a flowchart depicting a process 1100 for forming and bonding a composite laminate structure, having an integrated form, with a preformed component. In step 1102, a skin is positioned on a tool surface. Bonding agent is selectively applied to the preformed component, in step 1104. If the final, composite laminate product is to have a base laminate section (i.e., a laminate section between the skin and an integrated form) bonded with the skin (decision 1106) the base laminate section is arranged with the skin and in contact with the tool surface bonding agent, in step 1108. Additional bonding agent is applied to the base section in optional step 1109, e.g., if a second base section is to be laid over the base section, or if a form is to be bonded to the base section. Step 1108 and optional step 1109 may repeat until no further base laminate sections are required or desired. A hollow form is placed on the base section, in step 1110. Bonding agent is selectively applied to the base laminate section (e.g., the uppermost base laminate section), in step 1112. If no base laminate section is required or desired, a hollow form is placed directly on the preformed component, in step 1114.

In step 1116, at least one upper laminate section is placed about the hollow form and contacting the bonding agent (upon the base laminate section, if steps 1108-1112 previously occurred; upon the preformed component, if step 614 directly followed decision 1106). Vacuum bagging material is arranged about the laminate, in step 1118, and sealed to the skin and about a vent in the hollow form, in step 1120. As explained above with respect to FIGS. 4 and 5, the vent may be a preexisting vent about which the at least one upper laminate section is arranged, or the vent may be formed through the upper laminate section and the form, after the upper laminate section is in place.

A vacuum is applied within the sealed vacuum bag, at step 1122, and the assembly is cured in an autoclave, in step 1124. For example, the bagged assembly is placed in an autoclave with a vacuum connection to the vacuum bag, and a vacuum is applied within the bag to compress upper and (if used) lower laminate sections together and to the preformed component, allowing the applied bonding agent to bond the applicable parts. Once a predetermined autoclave pressure is reached, the vacuum connection is opened, and autoclave pressure is transferred to the laminate to maintain and/or augment compression of the laminate about the form, to the skin and together, if multiple laminate sections are used, while the bonding agent cures. The form vent allows pressure equalization within and outside of the hollow form, preventing collapse or deformation of the form as the laminate is compressed.

In one example of steps 1102-1124, skin 803 (FIG. 8) is laid on tool surface 802 and bonding agent 809 is selectively applied to skin 803, at intended contact points between skin 803 and one or more composite laminate sections (steps 1102-1104). Although not depicted between steps 1104-1116, bonding agent 809 may optionally be applied at one or more intended contact points between skin 803 and a form, where the form is to be a permanent part of the final composite product. In this example, the final composite product will not include a base laminate section (decision 1106), and hollow form 1104 is placed directly on skin 803 (step 1114). At least one upper laminate section, i.e., laminate 808, is placed about form 804, in contact with bonding agent 809 on skin 803 (step 1116). Vacuum bag 810 is arranged about laminate 808 and sealed to skin 803 and about or proximate form vent 806/open end 805, for example using adhesive 812 (steps 1118-11620). Vacuum bag 810 may be sealed anywhere along form 804 and skin 803 so long as all of laminate 808 is enclosed within vacuum bag 810.

Once bag 810 is sealed about laminate 808, a vacuum is applied within bag 810 (step 1122), and the assembly is cured in an autoclave as described above (step 1124).

In another example of steps 1102-1124, skin 903 (FIG. 9) is placed on tool surface 902 and bonding agent 909 is selectively applied to component 903 at intended contact points between component 903 and composite laminate (steps 1102-1104). In this example, the final composite product will include at least one base laminate section (decision 1104). A base laminate section (e.g., section 908D) is placed on skin 903, in contact with bonding agent 909 (step 1108). Additional bonding agent is applied to the base laminate section in optional step 1109. Further base laminate sections (e.g., sections 908C and 908B) may be applied, with bonding agent between, in as many repetitions of steps 1108-1109 as are required or desired.

Hollow form 904 is placed atop the final base section, optionally in contact with bonding agent 909 upon the base section (step 1110). Bonding agent is selectively applied to the upper base section and optionally, to form 904 (step 1112), and an upper laminate section, such as laminate section 908A, is placed about form 904 and in contact with bonding agent 909 (step 1116). Vacuum bag 910 is placed about laminate sections 908A-908D and sealed to component 903 and form 904, proximate or about form vent 906/open end 905, leaving the vent open to ambient pressure (steps 1118-1120). Vacuum bag 910 may be sealed to an open area of form 904, proximate end 905, where laminate 808 does not extend up to open end 905 of form 904. Where laminate 908 extends to open end 905, vacuum bag 910 may be sealed to the edges of end 905 or to inside surfaces of end 905, so long as vent 906 is maintained.

Once bag 810 is sealed about laminate 808, a vacuum is applied within bag 810 (step 1122), and the assembly is cured in an autoclave as described above (step 1124).

It will be appreciated that, although not specifically shown in FIG. 11, multiple upper laminate sections may be applied over form 904, for example as depicted in FIG. 4. As also shown and described with respect to FIG. 4, laminate sections may be cut and laid out on a skin (e.g., skin 703, 803, 903) such that the ply of each section is arranged at a selected angle relative to the ply of adjacent laminate sections.

It will also be appreciated that the processes described above may be extended to bonding already formed parts with other formed parts (for example, bonding a stringer with a skin serving as the tool surface, or bonding a pre-formed component to a composite skin on a tool surface), with appropriate adjustments in vacuum bagging and other techniques. Such adaptations are described further in co-pending U.S. patent application Ser. No. 12/779,762 entitled "Process for Bonding a Vented Hollow Component," and Ser. No. 12/779, 706 entitled "Process for Bonding Components to a Surface," the disclosures of which are incorporated herein by reference.

Certain changes may be made in the above systems and methods without departing from the scope hereof; thus, it is intended that all matter contained in the above description or shown in the accompanying drawings be interpreted as illustrative and not in a limiting sense. It is also to be understood that the following claims are to cover generic and specific features described herein, and all statements of the scope of the invention which, as a matter of language, might be said to fall there between.

What is claimed is:

1. A fabrication process using an integrated form, comprising the steps of:
   assembling at least two independent sections of composite laminate about a form, such that at least a portion of the sections overlap;
   applying a bonding agent between the sections, at the overlap;
   vacuum-bagging the form and laminate assembly;
   sealing the vacuum bag around a vent in the form, and about the laminate assembly;
   applying a vacuum within the bag, to bond the sections; and
   autoclaving the bagged form and laminate assembly such that the atmosphere of the autoclave directly contacts the interior of the form, to cure the bonded laminate sections;
   the form being structurally sufficient to maintain shape during curing without additional internal support.

2. Process of claim 1, further comprising the step of creating an aperture through the vacuum bag and the form, to vent the form;
   wherein sealing the vacuum bag around the vent comprising sealing the bag about a rim of the aperture, to maintain airflow through the form.

3. Process of claim 1, the step of sealing the bag around a vent in the form comprising sealing the bag around the vent with a form-bag seal.

4. Process of claim 1, the step of sealing the vacuum bag around a vent in the form and about the laminate assembly further comprising:
   sealing free edges of the vacuum bag to a tool surface supporting the form and laminate assembly, such that the laminate sections are covered by the vacuum bag.

5. Process of claim 1, the form comprising a hollow paper structure.

6. Process of claim 5, wherein applying the vacuum compresses the independent sections together, to bond the sections.

7. Process of claim 5, the vent comprising an open end of the hollow paper structure;

wherein sealing the vacuum bag around a vent in the form comprises sealing the vacuum bag around the form, and about the laminate, proximate the open end, to maintain airflow through the form.

8. Process of claim 1, the form selected from the group of a lightweight hat for forming a cross stringer, and a lightweight tube for forming a longitudinal stringer.

9. Process of claim 1, wherein the vent facilitates equalization of pressure inside and outside of the form, to prevent deformation of the form under autoclave pressures.

10. Fabrication process using an integrated form, comprising:
   placing a first laminate section on a tool surface;
   placing a vented form on the first section;
   selectively applying a bonding agent to the first section;
   placing a second laminate section about the form and in contact with the bonding agent, leaving the form vent clear;
   sealing a vacuum bag around the form vent to enclose the sections while maintaining airflow through the form vent;
   applying a vacuum within the vacuum bag, to bond the sections; and
   autoclaving the bagged sections and form such that the atmosphere of the autoclave directly contacts the interior of the form, to cure the bonding agent and form a composite laminate product; the vented form comprising a permanent part of the composite laminate product;
   wherein the vented form remains free of additional internal support during autoclaving.

11. Process of claim 10, wherein the form vent facilitates equalization of pressure within and outside of the form, such that autoclave pressures cure the laminate without crushing the form.

12. Process of claim 10, further comprising the step of sealing free edges of the bag to the tool surface, around the laminate sections, prior to applying the vacuum.

13. Process of claim 10, the form comprising a hollow paper structure.

14. Process of claim 13, the form vent comprising an open end of the hollow paper structure.

15. Process of claim 13, the form vent being an aperture in the hollow paper structure.

16. Process of claim 10, further comprising the step of placing a third laminate section with the form and in contact with one or both of (a) the bonding agent applied to the first section and (b) a bonding agent applied to the second section;
   wherein applying the vacuum bonds the third section to the first and/or second section; and
   wherein autoclaving the bagged sections comprises curing the bonding agent or agents in a single autoclave cycle.

17. Fabrication process using an integrated form, comprising:
   assembling two or more laminate sections about a hollow form on a tool surface;
   applying a bonding agent at a joinder of the sections;
   covering the one more laminate sections with vacuum bag material;
   sealing the vacuum bag material to the tool surface, over the one or more sections;
   sealing the vacuum bag material to the hollow form, over the one or more sections and proximate an open end of the form;
   applying a vacuum within the sealed vacuum bag material, to compress and bond the sections; and
   autoclaving the bagged sections, form and tool surface such that the atmosphere of the autoclave directly contacts the interior of the form, to cure the bonding agent and form a composite laminate product;
   wherein the hollow form is structurally sufficient to maintain shape during curing without additional internal support; and
   wherein the hollow form comprises a permanent part of the composite laminate product.

18. Process of claim 17, further comprising the step of sealing the hollow form to the tool surface.

19. Process of claim 17, the hollow form comprising paper.

20. Process of claim 19, the hollow form comprising a paper tube for forming a longitudinal stringer.

21. Process for bonding a vented hollow component, comprising the steps of:
   applying a bonding agent to an aircraft skin, at an intended point of contact with a base laminate section;
   placing the base laminate section with the aircraft skin and in contact with the bonding agent;
   placing a hollow form with the base section;
   applying additional bonding agent to the base section, at an intended point of contact with at least one upper laminate section;
   assembling the upper section about the hollow form and in contact with the bonding agent on the base section, such that the upper section covers at least a portion of the base section;
   placing vacuum bagging material about the laminate sections and the form;
   sealing the vacuum bagging material to the skin and about a vent in the form, to enclose the laminate sections and at least a portion of the form in the bagging material;
   applying a vacuum within the bagging material, to compress the laminate sections together about the form and to the skin; and
   autoclaving the laminate sections with the skin and the vented form such that the atmosphere of the autoclave directly contacts the interior of the form, to cure the bonding agent and form a final composite laminate product, the hollow form being structurally sufficient to maintain shape during curing, without additional internal support.

22. Process of claim 21, wherein assembling the upper section about the form comprises selectively arranging the upper section such that a ply direction of the upper section is at a predetermined angle relative to a ply direction of the base section.

* * * * *